United States Patent
Skvarla et al.

(10) Patent No.: US 7,216,516 B2
(45) Date of Patent: May 15, 2007

(54) WOBBLE JOINT

(75) Inventors: William Paul Skvarla, Saginaw, MI (US); Leland Nels Olgren, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 564 days.

(21) Appl. No.: 10/254,135

(22) Filed: Sep. 25, 2002

(65) Prior Publication Data

US 2003/0061845 A1    Apr. 3, 2003

Related U.S. Application Data

(60) Provisional application No. 60/325,625, filed on Sep. 28, 2001.

(51) Int. Cl.
*D06F 37/40*    (2006.01)

(52) U.S. Cl. .......................................... 68/131; 68/133

(58) Field of Classification Search ................ 403/112, 403/113, 114, 115, 116
See application file for complete search history.

(56) References Cited

U.S. PATENT DOCUMENTS

| | | | | |
|---|---|---|---|---|
| 2,077,806 A | * | 4/1937 | Muros ......................... 30/43.3 |
| 2,145,454 A | * | 1/1939 | Miller ........................... 68/28 |
| 2,302,995 A | * | 11/1942 | Holmes ......................... 74/60 |
| 2,379,454 A | * | 7/1945 | Nowka .......................... 74/63 |
| 2,424,660 A | * | 7/1947 | Howard ......................... 74/60 |
| 2,455,166 A | * | 11/1948 | Firth ........................... 384/474 |
| 2,455,289 A | * | 11/1948 | Balerlein ....................... 92/70 |
| 2,463,347 A | * | 3/1949 | Aron et al. .................. 333/256 |
| 2,603,982 A | * | 7/1952 | Davis et al. ................. 368/171 |
| 2,653,456 A | | 9/1953 | Heym |
| 2,703,736 A | * | 3/1955 | Cart ........................... 384/193 |
| 2,715,826 A | * | 8/1955 | Kirby ........................... 68/23.6 |
| 2,809,504 A | | 10/1957 | Erish |
| 2,823,975 A | | 2/1958 | Kirby |
| 2,924,086 A | * | 2/1960 | Fields ........................... 68/23.6 |
| 2,969,777 A | * | 1/1961 | Blazs ........................... 418/53 |
| 2,974,515 A | * | 3/1961 | Smith et al. .................. 68/131 |
| 3,102,410 A | * | 9/1963 | Doyle ........................... 68/23.5 |
| 3,333,478 A | * | 8/1967 | Papst ............................ 74/60 |
| 3,416,379 A | * | 12/1968 | Robbins ...................... 74/18.1 |
| 3,425,239 A | * | 2/1969 | Baier ........................... 464/27 |

(Continued)

FOREIGN PATENT DOCUMENTS

DE    2847515    5/1980

(Continued)

*Primary Examiner*—Frankie L. Stinson
(74) *Attorney, Agent, or Firm*—Michael D. Smith

(57) ABSTRACT

A wobble joint particularly useful for supporting a wash plate in a wash basket of an automatic washing appliance includes inner and outer races formed with mating part-spherical surfaces having common centers of curvature about a longitudinal axis of the joint. Anti-rotation structure acts between the inner and outer races to prevent relative rotation of the races about the longitudinal axis, and cooperates with the part-spherical surfaces to restrict the races to two degrees of tilting movement about respective tilt axes disposed perpendicular to the longitudinal axis and to one another, such that one of the races is thereby supported for wobbling movement relative to the other of the races. In a washing appliance application, the wash plate is fixed to the outer race and wobbles relative to the inner race.

4 Claims, 4 Drawing Sheets

U.S. PATENT DOCUMENTS

| | | | | |
|---|---|---|---|---|
| 3,435,709 A | * | 4/1969 | Looker | 475/16 |
| 3,662,608 A | * | 5/1972 | Vold | 74/5 R |
| 3,727,430 A | * | 4/1973 | Eddy | 464/146 |
| 3,933,052 A | * | 1/1976 | Coles | 74/18.1 |
| 4,132,452 A | * | 1/1979 | Riegler et al. | 384/2 |
| 4,155,670 A | * | 5/1979 | Stafford | 405/202 |
| 4,156,354 A | | 5/1979 | Krude | |
| 4,335,963 A | * | 6/1982 | Jameson et al. | 366/63 |
| 4,727,761 A | * | 3/1988 | Scalzo | 74/60 |
| 5,460,018 A | | 10/1995 | Werner et al. | 68/23.6 |
| 6,115,863 A | * | 9/2000 | Mason et al. | 8/159 |
| 6,227,013 B1 | | 5/2001 | Wyatt-Smith | 68/134 |
| 6,604,389 B2 | | 8/2003 | Skvarla et al. | |
| 6,886,372 B2 | * | 5/2005 | Kropf | 68/23.7 |

FOREIGN PATENT DOCUMENTS

| | | |
|---|---|---|
| DE | 7636309 | 11/1983 |
| GB | 759839 | 10/1956 |

* cited by examiner

WOBBLE JOINT

The disclosure incorporates the wobble joint disclosed in provisional patent application No. 60/325,625, filed Sep. 28, 2001, whose priority is claimed for this application.

TECHNICAL FIELD

This invention relates generally to mechanical joints, and particularly wobble joints wherein one joint member is able to wobble or gyrate about an axis of another joint member through restricted motion of the connection of the joint members.

BACKGROUND OF THE INVENTION

U.S. Pat. No. 6,115,863 discloses an automatic washing appliance in which a wash plate is supported for wobbling movement within a wash basket for laundering cloths. FIG. 4 of this patent discloses a wobble joint which supports the wash plate for wobbling action during operation of the appliance. The joint is made up in total of at least 11 separate parts which, when assembled, operate to support the outer joint member for relative wobbling movement relative to the inner joint member.

It is an object of the present invention to simplify the manufacture and improve upon the performance of such wobble joints for use in washing appliances and other applications.

SUMMARY OF THE INVENTION

A wobble joint constructed according to a presently preferred embodiment of the invention has an inner and outer race with mating part-spherical surfaces with a common center of curvature. Anti-rotation structure acts between the races to secure them against rotation about a longitudinal axis of the joint, while cooperating with the part-spherical surfaces of the races to restrict the races to two degrees of tilting movement about tilt axes which are perpendicular to the longitudinal axis of the joint and perpendicular to one another such that one of the races is thereby supported for wobbling movement relative to the other of the races.

According to a further aspect of the invention, an automatic washing appliance is provided having a wash basket and a wash plate disposed within the basket and supported by the subject wobble joint such that the wash plate moves with wobbling action within the wash basket.

The invention has the advantage of providing a wobble joint of simple construction having only an inner and outer race, rather than the necessity of an intermediate race as with the known prior art wobble joints.

The invention has the further advantage of minimizing the number of component parts needed to make up the joint. According to one preferred embodiment, the total number of component parts of the joints is three, namely an outer race, an inner race, and a retainer which is carried by one of the inner and outer races and rides in a retaining groove of the other race. The present wobble joint is inexpensive to manufacture and assemble.

The engaging part-spherical surfaces of the inner and outer joint members have the advantage of minimizing lash and thus noise of the joint, providing for the smooth, quite joint.

BRIEF DESCRIPTION OF THE DRAWINGS

The present invention will not be described, by way of example, with reference to the accompanying drawings, in which.

DESCRIPTION OF THE PREFERRED EMBODIMENT

Various embodiments of wobble joints constructed according to the invention are disclosed. Each has an inner race and an outer race disposed circumferentially about the inner race. The races are disposed about a longitudinal axis. The races are formed with mating part-spherical surfaces. Means are provided for securing the races against relative rotation in the circumferential direction. Means are provided for limiting relative tilting movement of the races to two degrees of motion, whereby the outer race is able to radially gyrate or wobble about the axis relative to the inner race without rotating in the circumferential direction. In each case, the wobbling movement is achieved with only two races.

Figure 1:
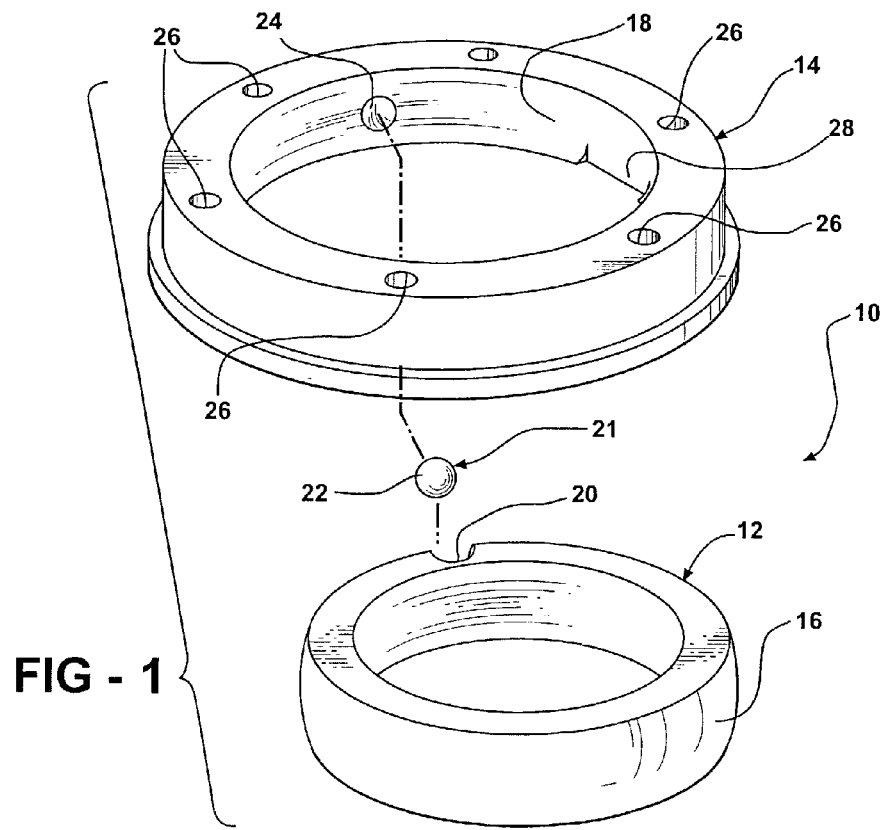
FIG. 1 is an exploded perspective view according to a first embodiment.
Figure 2:
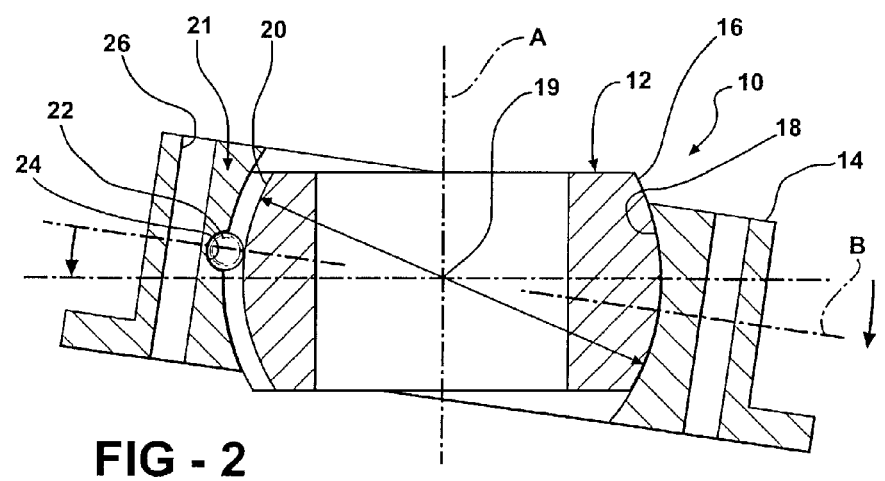
FIG. 2 is an enlarged cross-sectional view of the assembled joint of FIG. 1.
Figure 3:
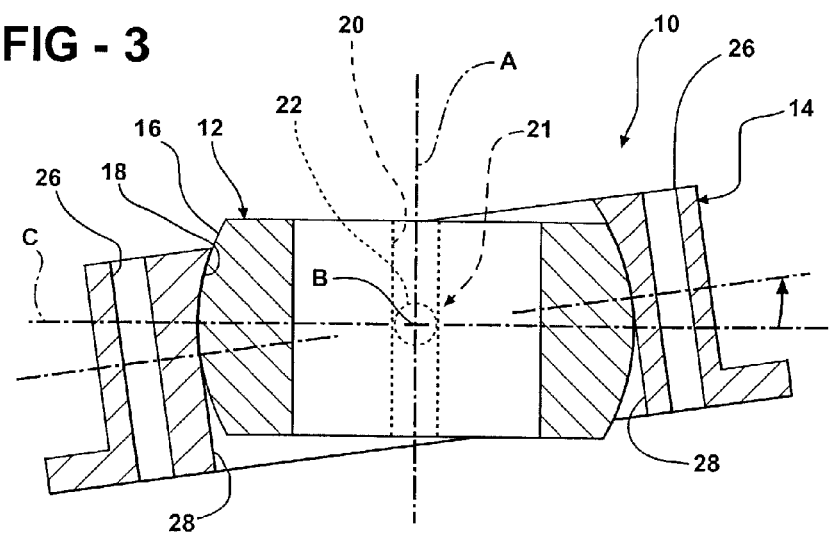
FIG. 3 is another cross-sectional view of the joint of FIG. 1.

A wobble joint constructed according to a first embodiment of the invention is shown generally at 10 in FIGS. 1–3 and includes an inner race 12 and an outer race 14. Both races are generally ring-shaped and the outer race 14 is disposed circumferentially about the inner race 12. The inner race 12 has a radially outer convex part-spherical surface 16 that nests with a radially inner concave part-spherical surface 18 of the outer race 14. The surfaces 16, 18 have a common center of curvature 19 lying along a central longitudinal axis A and forming a center of the joint 10.

According to the first embodiment, anti-rotation structure 21 acts between the races 12, 14 to prevent relative rotation about the axis A. The structure 21 of the first embodiment includes an axial groove or slot 20 provided in one of the surfaces 16 or 18 and extending in the direction of the axis A in a plane containing the axis A, and a ball 22 supported in a ball socket or pocket 24 of the other of the surfaces 16 or 18. The groove 20 is preferably radiased or convexly curved in the axial direction and may share the same center of curvature 19 as that of the surfaces 16, 18. The ball 22 extends into the groove 20 and interacts with the walls of the groove 20 and pocket 24 to support the races 12, 14 against relative rotation in the circumferential direction. The interaction of the ball 22 and groove 20 further serve to restrict the relative tilting movement of the races 12, 14 to two degrees of motion about a first axis B and a second axis C transverse to the first axis B. The first axis B passes through the center of the ball 22 and intersects the axis A of the inner race 12. The second axis C is offset 90 degrees from the first axis B and is perpendicular to the longitudinal axis A. Relative tilting movement about the second axis C occurs through relative movement of the ball 22 along the groove 20. The combined two degrees of motion about the tilt axes B, C enable the outer race 14 to move with the aforementioned wobbling action relative to the inner race 12 without rotation of the outer race 14 about the longitudinal axis A.

The outer race 14 may be provided with mounting features 26, such as bolt holes, which enable an object, such as a wash plate of a washing machine, to be secured to the outer race 14 for controlled wobbling action. The races 12, 14 may further include relief features to assist in assembling the inner race 12 within the outer race 14. FIGS. 1 and 2 show opposing notches 28 formed in the outer race 14 of sufficient size to receive the inner race 12 into the outer race 14 on edge, after which the inner race 12 is turned 90 degrees to fully nest the surfaces 16, 18 and thereby retain the inner race 12 within the outer race 14. If radial retention of the inner race 12 is not necessary for a given application, then the notch 28 can extend fully around the outer race 14 to provide an open end of the outer race 14 of sufficient size to receive the inner race 12 with their axes aligned. Rather than, or in addition to, the notches 28, the inner race 12 can be formed with one or more flats or relieved areas that provide sufficient clearance to enable the inner race 12 to be installed in the outer race 14 on edge.

Figure 4:
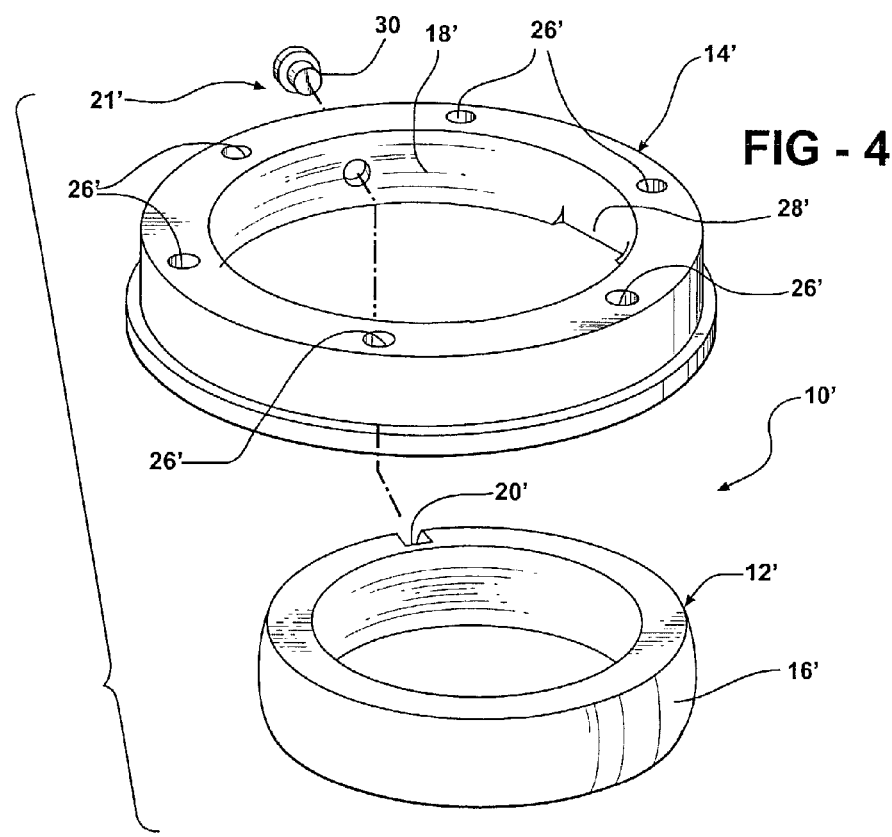
FIG. 4 is an exploded perspective view of an alternative wobble joint.
Figure 5:
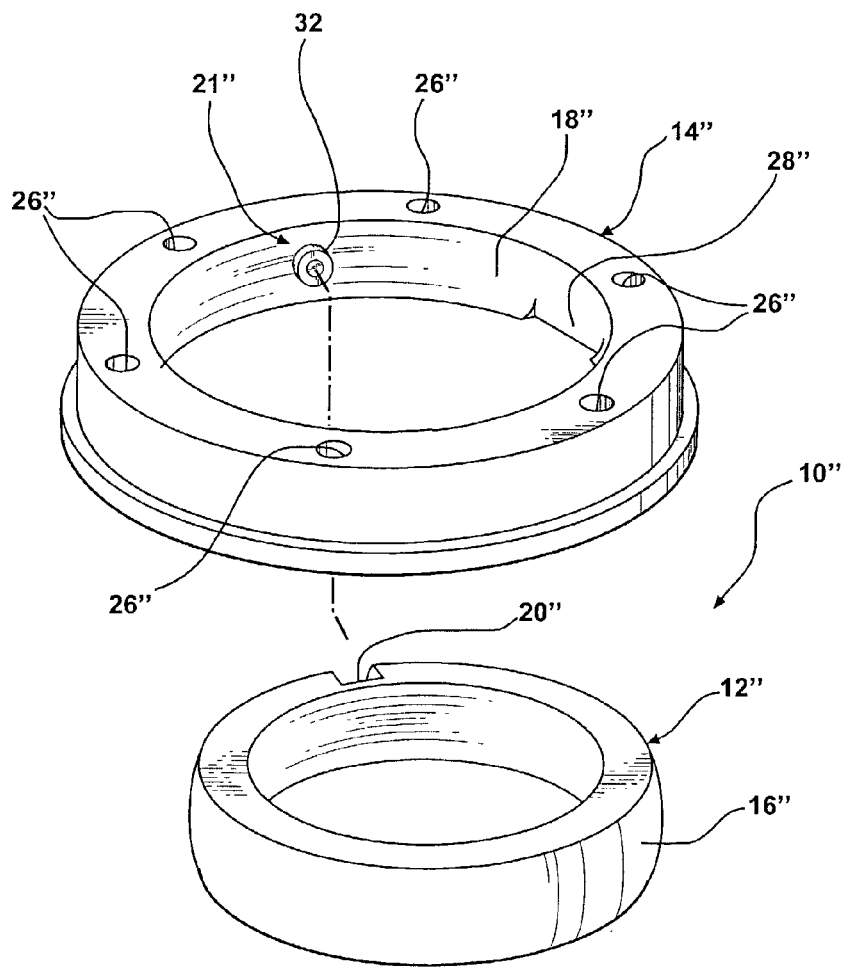
FIG. 5 is an exploded perspective view of another alternative wobble joint.

In lieu of the ball 22, a pin 30 or roller 32 may be provided, as illustrated in the second and third embodiments of the invention of FIGS. 4 and 5, respectively. Apart from the substitution of the ball 22 with the pin 30 or roller 32, all other features and operation of the joints are the same and are designated by the same reference numerals, but are primed and double primed, respectively in the drawings.

Figure 6:
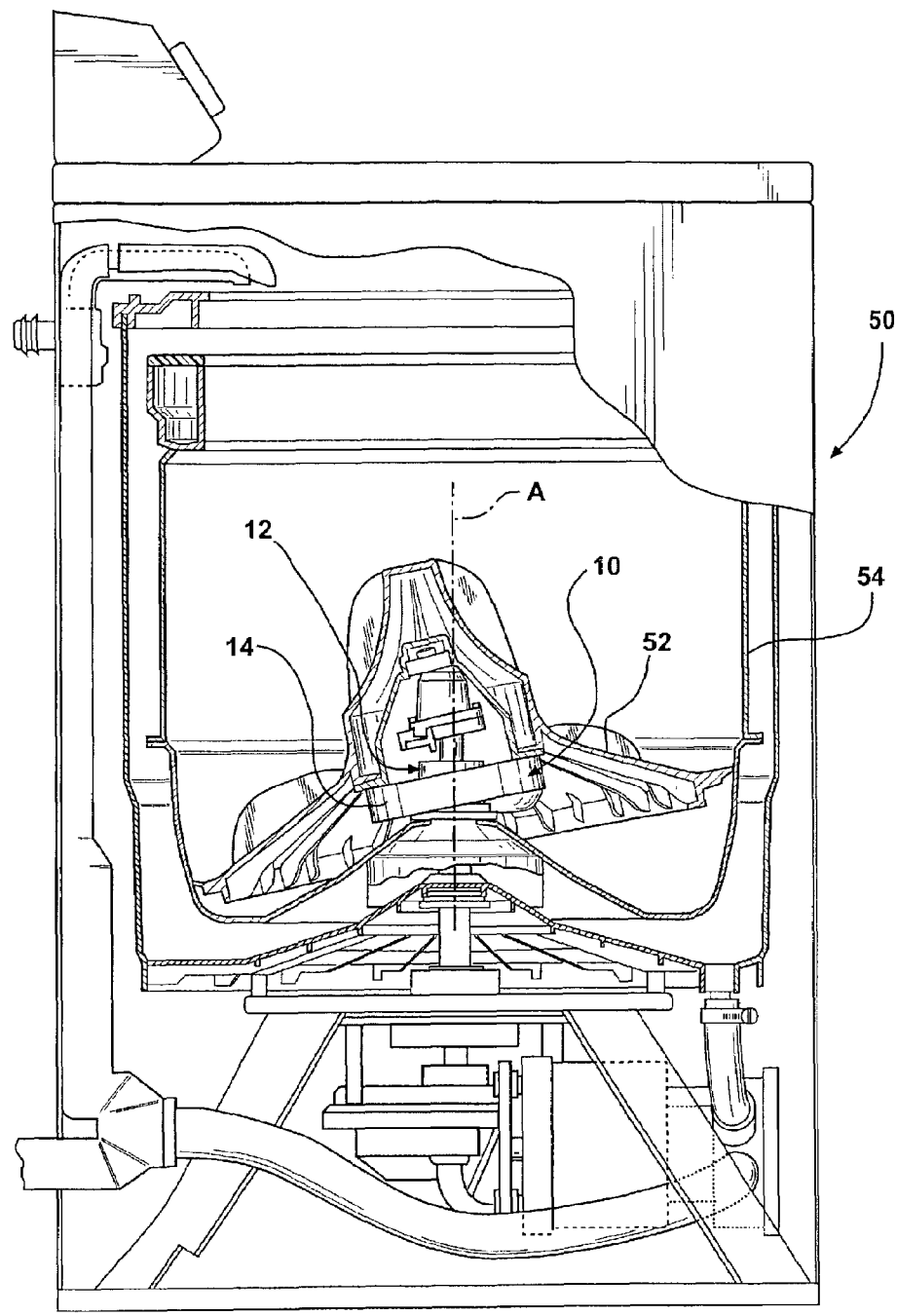
FIG. 6 is an elevation view show broken away and partly in section of an automatic washing appliance fitted with a wobble joint according to the invention.

FIG. 6 shows the wobble joint 10 of the invention installed as a component in a vertical shaft automatic washing appliance or machine 50 of the type having a bottom wash plate 52 supported for wobbling action within a wash drum or basket 54. U.S. Pat. No. 6,115,863 (the '863 patent) discloses such a washing machine. The disclosure of the '863 patent is incorporated herein by reference for a detailed description of the construction and operation of such wobble plate washers. FIG. 4 of the '863 patent shows a three-piece nested U-joint assembly used to support the wash plate for wobbling action. FIG. 6 of the present application shows how the simple two-piece wobble joint 10 of the invention can be substituted for the U-joint in order to simply the of the construction and operation of the washer.

The disclosed embodiment is representative of a presently preferred form of the invention, but is intended to be illustrative rather than definitive thereof. The invention is defined in the claims.

The invention claimed is:

1. An automatic washing appliance, comprising:
   a wash basket;
   a wash plate disposed in said wash basket; and
   a wobble joint mounting said wash plate for wobbling action within said wash basket, including an inner race supported against tilting movement and having a part-spherical surface with a center of curvature disposed on a longitudinal axis of said joint, and outer race fixed to said wash plate and having a part-spherical surface disposed in mating engagement with said part-spherical surface of said inner race, and an anti-rotation structure acting between said races to secure said races against relative rotational movement and cooperating with said part spherical surfaces to restrict said races to two degrees of freedom of tilting movement about respective tilt axes disposed perpendicular to said longitudinal axis of said joint and to one another to enable said outer race and said wash plate to wobble relative to said inner race and said wash basket with said anti-rotation structure including a groove formed in said part-spherical surface of one of said races and at least one associated retainer carried by the other of said races and movable along said groove along one of said tilt axes, and said other of said races including a socket along said one of said tilt axes with said retainer rotatably coupled to said socket for allowing rotation of said retainer relative to said races and for restraining axial movement of said retainer relative to said other of said races during an operation of said automatic washing appliance.

2. The automatic applicant of claim 1 wherein said groove traces a part-spherical path along its length.

3. The automatic applicant of claim 2 wherein said part-spherical path has a center of curvature common with that of said mating part-spherical surfaces of said races.

4. The wobble joint of claim 1 wherein said retainer comprises a shaft and a roller with said shaft engaging said socket and said roller rotatably mounted about said shaft.

* * * * *